United States Patent Office 3,280,125
Patented Oct. 18, 1966

3,280,125
HYDROXYETHYLBENZENESULFONAMIDO-LOWER ALKOXY-PYRIMIDINES
Harald Horstmann, Wuppertal-Vohwinkel, and Sophie Wirtz, Wuppertal-Elberfeld, Germany, assignors to Farbenfabriken Bayer Aktiengesellschaft, Leverkusen, Germany, a corporation of Germany
No Drawing. Filed June 29, 1964, Ser. No. 378,939
Claims priority, application Germany, June 29, 1963, F 40,115
4 Claims. (Cl. 260—256.5)

The present invention relates to novel sulphonamide derivatives and various syntheses for their production. More particularly, the invention is concerned with the provision of compounds of the general class described which have been found to possess anti-diabetic activity and reduced toxicity as contrasted with known compounds of this general type.

U.S. Patent 3,207,758 granted September 21, 1965 describes the production of sulphonamides of the general formula:

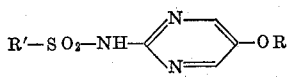

wherein R represents an alkyl group containing from 2 to 5 carbon atoms and R′ is a phenyl nucleus which may be unsubstituted or substituted by lower alkyl and/or alkoxy radicals and/or halogen atoms.

Belgian Patent No. 609,270 describes sulphonamides of the general formula:

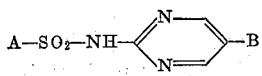

wherein A represents a phenyl radical which may be unsubstituted or substituted by from 1 to 2 lower alkyl or alkoxy groups as well as by a halogen atom, or a saturated or unsaturated branched, unbranched or cyclic hydrocarbon radical which may be interrupted by one or more oxygen atoms; B represents a grouping —X—R′ wherein X denotes a direct bond or an oxygen atom and R′ is a saturated or unsaturated straight-chain or branched or cyclic hydrocarbon radical which may be interrupted by one or more oxygen atoms.

Additionally, application Serial No. 327,807 filed December 3, 1963 and now abandoned describes the preparation of compounds of the general formula:

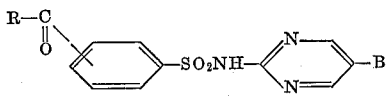

wherein B has the same meaning as defined above and R is an alkyl group containing from 1 to 3 carbon atoms.

All the above compounds possess anti-diabetic activity.

The present invention is based, at least in part, on the discovery that sulphonamides possessing comparable antidiabetic activity but reduced toxicity are obtained when compounds of the general formula:

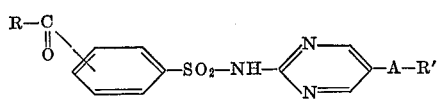

wherein A represents a direct bond or an oxygen atom, R′ is a saturated or unsaturated branched, unbranched or cyclic hydrocarbon radical, which may be interrupted by one or more oxygen atoms, and R is an alkyl radical containing from 1 to 3 carbon atoms, are reacted, by a method known per se, with reducing agents such as catalytically activated hydrogen, lithium aluminium hydride or sodium in alcohol. A Meerwein-Ponndorf reduction also produces useful results and this reaction offers particular advantages when the above defined compounds are reduced in water with sodium borohydride in the presence of at least one equivalent amount of an alkali metal hydroxide, in that, this procedure allows the operation to be carried out in a homogeneous phase without any need for a supply of energy and because no special precautionary measures have to be taken.

The sulphonamides of the general formula:

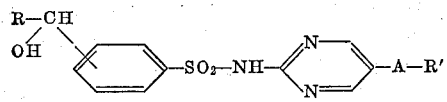

which are formed by this reduction can also be obtained, in accordance with the invention, when compounds of the general formula:

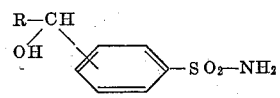

wherein R has the same meaning as defined above, are reacted, in the form of their salts, or in the free state when acid-binding agents are also present, with 2-halogenopyrimidines of the general formula:

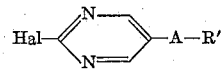

wherein A and R′ also have the same meaning as defined above, or by condensing the alkali metal salts of compounds of the general formula:

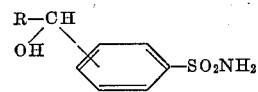

wherein R again has the same meaning as defined above, with a trialkylammonium 5-R′—A—pyrimidine salt, where R′—A— has the above specified meaning; or by carrying out a ring-closure condensation of compounds of the general formula:

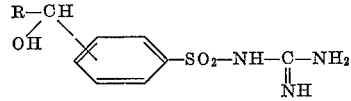

wherein R has the same meaning as defined above, with compounds of the general formula:

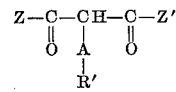

wherein R′—A— has the above specified meaning and Z and Z′ denote hydrogen atoms, and where the aldehydes may also be present in the form of their functional derivatives; or by reacting compounds of the general formula:

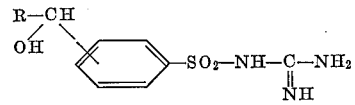

wherein R again has the same meaning, with the reaction products obtained by a Vilsmeier reaction from 1,1-dialkoxy-2-R′—A—ethanes or 1-R′—A—2-alkoxyethylene, where R′—A— has the above specified significance and where R′—A— may be dialkoxy groups, though R′—A— may also denote an alkoxy group, and N,N— disubstituted formamides and inorganic acid chlorides, such as phosphorus pentachloride or phosgene, as, for example, β-dialkylamino-α-R′—A—acroleins or their acetals, or with β-alkoxy-α-R′—A—acroleins or their acetals or with β- chloro-α-R'—A—acroleins or their acetals, or by reacting sulphonamides of the general formula:

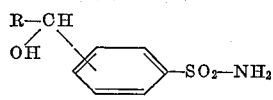

wherein R has the same meaning, with a 2-nitroamino- or 2-cyanoamino-5-R'—A—pyrimidine, where R'—A— again has the significance defined above, or by reacting sulphonic acids of the general formula:

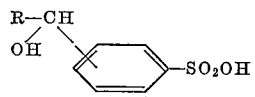

wherein R has the same meaning, by the method of Freudenberg with 2-acetylamino-5-R'—A—pyrimidines, where R'—A— has the same significance.

It is believed that the invention may be best understood by reference to the following specific examples illustrating the application of the foregoing principles and procedures to the production of typical compounds of the invention.

*Example I*

2-(4'-acetylbenzene-sulphonamido)-5-isopropoxy-pyrimidine, in amount of 8.4 grams, was dissolved in 100 milliliters of water by the addition of 1.3 grams of NaOH. NaBH₄, in amount of 1.9 grams, was introduced and the reaction mixture was stirred at room temperature for 12 hours. Excess of NaBH₄ was destroyed by adding acetic acid and the sulphonamide was precipitated at the same time. For purification, the latter was dissolved in dilute ammonium hydroxide solution, the solution was filtered clear and the sulphonamide was precipitated with glacial acetic acid. Seven (7) grams of 2-[4'-(α-hydroxyethyl)-benzene-sulphonamido]-5-isopropoxy-pyrimidine of melting point 166° C. were obtained.

2-[4'-(α-hydroxyethyl)-benzene-sulphonamido]-5-ethoxy-pyrimidine of melting point 184° C. and 2-[4'-(α-hydroxyethyl)-benzene-sulphonamido]-5-methoxy-pyrimidine of melting point 194° C. were obtained by an analogous method.

*Example II*

2-(4'-acetylbenzene-sulphonamido)-5-isopropoxy-pyrimidine, in amount of 8.4 grams, in the form of a solution in 250 milliliters of ethanol and 5 milliliters of H₂O, was hydrogenated at 60° C. under a pressure of 25 atmospheres in the presence of Pd-charcoal. When the calculated amount of hydrogen had been taken up, the contents of the autoclave were filtered, the solvent was evaporated, the residue was taken up in dilute ammonium hydroxide solution and precipitated with glacial acetic acid. Six (6) grams of the sulphonamide were obtained, with the melting point 163–165° C.

What is claimed is:

1. A sulphonamide of the formula:

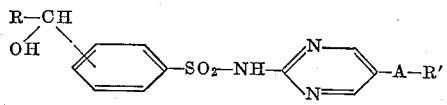

wherein R is alkyl of 1–3 carbon atoms and A—R' is lower alkoxy.

2. The chemical compound, 2-[4'-(α-hydroxyethyl)-benzene-sulphonamido]-5-isopropoxy-pyrimidine.

3. The chemical compound, 2-[4'-(α-hydroxyethyl)-benzene-sulphonamido]-5-ethoxy-pyrimidine.

4. The chemical compound, 2-[4'-(α-hydroxyethyl)-benzene-sulphonamido]-5-methoxy-pyrimidine.

No references cited.

ALEX MAZEL, *Primary Examiner.*

MARY U. O'BRIEN, *Assistant Examiner.*